Figure 1:
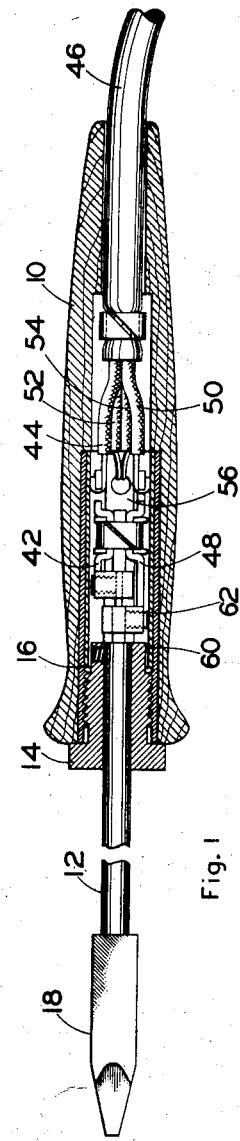

July 28, 1959

T. E. FINCH 2,897,335

TEMPERATURE CONTROLLED SOLDERING IRON

Filed June 23, 1958

INVENTOR.
Thomas E. Finch
BY M W Goodwin

His Attorney

United States Patent Office 2,897,335
Patented July 28, 1959

2,897,335

TEMPERATURE CONTROLLED SOLDERING IRON

Thomas E. Finch, Shelbyville, Ind., assignor to General Electric Company, a corporation of New York Application June 23, 1958, Serial No. 743,580

6 Claims. (Cl. 219—26)

This invention relates to a temperature controlled electric soldering iron and more particularly to novel and improved means for providing an electrical connection to a temperature sensitive control element disposed adjacent a hollow resistance heating element in the tip of a soldering iron where it is necessary or desirable to extend this connection longitudinally through the heating element where it will be subjected to severe ambient temperature variations.

One of the known constructions of a temperature controlled electric soldering iron comprises an elongated metal tube forming the shank of the iron and on one end of which is mounted a soldering iron tip within which is located a helical resistance heating element extending coaxially of the shank and which is embedded in suitable electrical insulation. A temperature sensitive control element, such as a thermocouple, is located in the tip of the iron adjacent the outer end of the heating element. To provide a compact economical structure, one of the leads for the thermocouple is extended longitudinally through the heating element and shank for connection at its other end to a suitable external control for the iron which will regulate the energizing of the heating element. This thermocouple lead is also suitably insulated from the heating element and shank, such as by embedding the lead in the insulating material in which the heating element is embedded.

It has been found that this lead from the thermocouple is sometimes subject to premature failure resulting in an open circuit in the thermocouple control. Such a failure of the thermocouple lead most frequently occurs in the portion of the lead adjacent the center portion of the heating element, and while the reason for such failure is not completely understood, it is believed that such may be occasioned by alternate compressive and tensive forces directed longitudinally of the lead as the result of thermal expansion and contraction of the lead due to the extreme temperature variations near the center of the heating element caused by the thermal cycling of the heater. This alternate longitudinal expansion and contraction of the lead may eventually cause fatigue failure of the lead.

It is a specific object of this invention to provide a soldering iron of the general type described wherein is provided a novel and improved electrical connection for a temperature sensitive control element in the tip of the iron which extends longitudinally of and through the heating element and which will not be adversely affected by substantial ambient temperature variations due to thermal cycling of the heating element.

In accomplishing the objects of my invention, and in one aspect thereof, I provide a helical wire conductor intermediate the length of the connector extending from a temperature sensitive control element disposed adjacent a helical resistance heating element longitudinally through the heating element. The helical conductor is located within the heating element and preferably extends in opposite directions from the center of the heating element where the greatest variations in temperature will occur.

Where the associated temperature sensitive control element is a thermocouple, the connector leading from the thermocouple and through the heating element, including the helical conductor, is fabricated of the same material as the portion of the thermocouple to which it is connected to avoid the provision of additional thermocouple junctions. The heating element and connector from the temperature sensitive element are radially spaced with electrically insulative material, such as compacted magnesium oxide, being disposed therebetween to insulate and space the two elements relative to each other.

Figure 2:
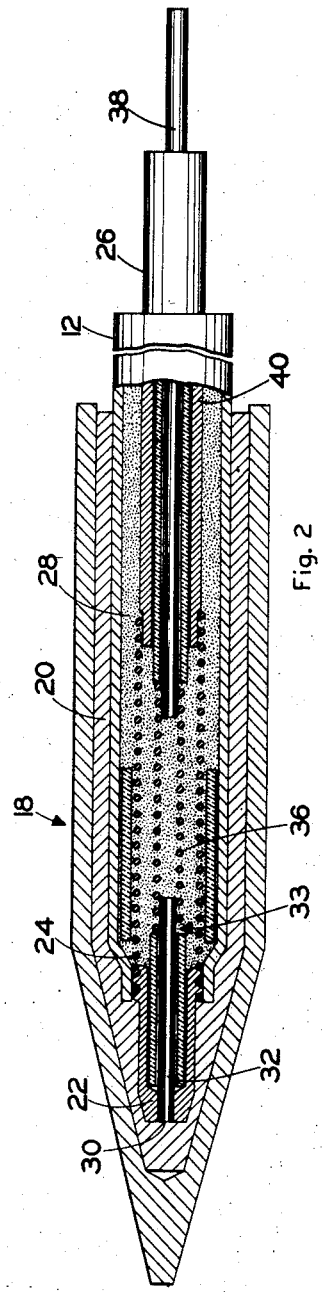

My invention will best be understood by reference to the accompanying drawing in which:

Fig. 1 is a side view, partly in section, of a soldering iron of a type with which my invention is concerned; and Fig. 2 is an enlarged fragmentary side view, partly in section, of the shank and tip portion of the iron of Fig. 1 showing, in detail, a preferred embodiment of my invention.

With reference to the drawing, a sodering iron of the type with which my invention is concerned comprises a hollow wooden handle 10 from one end of which extends a metal tube or cylinder 12 forming an outer housing for the shank of the iron. The tube 12 is retained within the handle by means of a bushing 14 threaded within a metal sleeve 16 engaged within one end of the handle. A set screw in the bushing is engageable with the shank to secure the same to the bushing. The tip 18 of the iron is carried by the outer end of the tube 12 and includes a copper liner 20 engaged over the outer end of the tube 12 and an iron sheath engaged over the liner. The liner is provided with a recess in its tip end forwardly of the outer end of the tube 12 in which is received a terminal 22, preferably of the same material as the tube 12. An elongated hollow resistance heating element 24 in the form of a helically wound wire coil is located substantially coaxially within the tube 12 in radially spaced relation thereto. The terminal 22 is externally threaded at its inner end for engagement with the outer end of the heating element, and the tube 12, heating element, and terminal are brazed or welded at this point to provide a secure mechanical and electrical connection thereof.

The inner end of the heating element is supported on one end of a tube or cylinder 26 extending substantially coaxially within the tube 12 in radially spaced electrically insulated relation. Suitable electrical insulation 28, such as compacted magnesium oxide, surrounds the heating element and tube 26 filling the space between these elements and inner wall of the tube 12. A temperature sensitive control element 30, in the form of a thermocouple, is located in the tip of the iron forward of the outer end of the heating element. The thermocouple is, in the specific embodiment shown, provided by a wire or rod 32 of a metal or alloy dissimilar from that of the terminal 22 which extends through an aperture in the outer end of the terminal and is trimmed flush with the outer end of the terminal.

In the interest of compactness and economy, one lead or connector 33 for the thermocouple extends longitudinally through the heating element and shank and comprises, in the specific embodiment shown, the rod 32, the outer end of which, in part, forms the thermocouple. In accordance with my invention the connector 33 further includes a helical wire conductor 36 mechanically and electrically connected at one end to the inner end of the rod 32 and disposed within the heating element and extending in opposite directions from the center of the element and longitudinally thereof in radially spaced relation. The helical conductor 36 is electrically insulated from the heating element by the embedding thereof in the compacted magnesium oxide embedding the heating element. The other end of the helical conductor is mechanically and electrically connected to the outer end of a straight wire or rod 38 completing the connector 33 and extending longitudinally through the tube 26 and electrically insulated therefrom by a ceramic sleeve 40. The rod or wire 32, helical conductor 36, and rod or wire 38 are preferably fabricated of the same material to avoid the provision of additional thermocouples. The connector 33 extends outwardly beyond the inner end of the tube 26 for connection to a terminal 42 within the handle which in turn is connected to one wire 44 of the four-wire cable 46. The tube 26 likewise extends beyond the inner end of the sheath 12 but terminates short of the inner end of the connector 33 and is electrically connected to a terminal 48 which is in turn connected to another wire 50 of the cable 46. The remaining two wires 52 and 54 of the cable are connected to a bus bar 56 extending toward the tip of the iron with the outer end thereof engaged in an annular recess 60 between the inner end of the bushing 14 and an insulating sleeve 62 disposed in telescopic engagement within the metal liner 16. In this manner the sheath 12 forms a common electrical return lead for the thermocouple and outer end of the heating element by reason of the common connection of these elements to the terminal 22 in the tip of the iron.

While I do not desire to be bound by the following theory, it is believed that inasmuch as the helical conductor is embedded in electrically insulative material and thus held substantially rigid, the expansion and contraction of the helical conductor due to thermal cycling will result in forces being imposed in a direction generally radially of the wire forming the helical conductor rather than longitudinally thereof as in the case of a straight rigid conductor. Such lateral forces on the helical conductor will not result in a fatigue of the wire forming the conductor, thus substantially eliminating the possibility of failure of the conductor due to thermal cycling of the heating element.

In the specific embodiment of Fig. 2, the helical conductor 36 is shown to be of a lesser length than the heating element and located centrally thereof with its ends located approximately equidistant from the respective ends of the heating element. If desired, however, the helical conductor could be extended to or beyond the ends of the heating element. It is preferred though that the helical conductor be located so as to extend in opposite directions from the center of this heating element inasmuch as the center portion within the heating element is where the greatest variations in ambient temperature and thus thermal stresses will occur. While my invention has been described in terms of the helical conductor 36 being substantially rigidly held, it is of course obvious that the provision of the helical conductor as described would also be advantageous if the conductor were not embedded or otherwise rigidly held.

While my invention has been described and specifically shown in connection with a soldering iron, where it has particular utility, it should be understood that my invention is not limited to this specific application but may be applied to other devices utilizing an integral temperature sensitive control element in association with a resistance heating element. It is therefore to be understood that my invention is limited only by the scope of the appended claims and includes such different embodiments and modifications thereof as may fall within the language of the appended claims.

What I claim as new and desire to secure by Letters Patent of the United States is:

1. A temperature controlled electric resistance heating device comprising a hollow elongated resistance heating element, a temperature sensitive control element disposed adjacent the heating element so as to be affected by the heat produced thereby, and an electrical connector for the control element extending longitudinally of and through the heating element including a helical conductor electrically connected at one end to the control element and disposed at least partly within the heating element in radially spaced relation and extending in opposite directions from the center of the heating element toward the opposite ends thereof, and electrically insulating means surrounding the helical conductor and insulating the helical conductor from the heating element.

2. A temperature controlled electric resistance heating device comprising a sheath, a hollow elongated resistance heating element disposed within the sheath, a temperature sensitive control element disposed within the sheath adjacent the heating element so as to be affected by the heat produced by the heating element, and an electrical connector for the control element connected at one end to the control element and extending longitudinally through the heating element including a helical wire conductor located centrally within and extending longitudinally of the heating element, and electrically insulating material disposed between the helical conductor and heating element.

3. A temperature controlled electric resistance heating device comprising a metallic sheath, a wire resistance heating element disposed within the sheath and electrically connected to the sheath at one end thereof, a temperature sensitive control element adapted to be connected in a control circuit for the heating device, the control element being disposed within the sheath adjacent the heating element so as to be affected by the heat produced by the heating element, and an electrical connector for the control element extending longitudinally of and through the heating element and including a helical wire conductor extending longitudinally of and located centrally within the heating element in radially spaced relation and electrically connected to said control element, and electrical insulative material embedding the helical conductor and electrically insulating the same from the heating element.

4. A temperature controlled resistance heater comprising an elongated metal sheath, a hollow resistance heating element extending longitudinally within the sheath, a hollow terminal disposed at least partially within the sheath and connected to one end of the heating element, a temperature sensitive control element disposed within the sheath adjacent the other end of the heating element, an electrical connector for the control element connected at one end to the control element and extending longitudinally of and the heating element including a helical wire conductor disposed within the heating element in electrically insulated spaced relation and extending in opposite directions from the center of the heating element toward the opposite ends respectively of the heating element, the end of said helical conductor extending toward said other end of the heating element being electrically connected to said temperature sensitive control element, and a straight electrical conductor extending from the end of the helical conductor next adjacent said one end of the heating element longitudinally of and within said hollow terminal in electrically insulated spaced relation.

5. In a temperature controlled electric soldering iron of a type including an elongated metal sheath, a tip mounted on one end of the sheath and electrically connected thereto, a hollow electric resistance heating element extending longitudinally of and within the sheath adjacent the tip and electrically connected to the sheath at one end, and a temperature sensitive electrical control element in the tip electrically connected to the sheath; an electrical connector for the control element comprising a helical wire conductor electrically connected at one end to the control element and disposed within the heating element in radially spaced relation, the helical conductor extending longitudinally in opposite directions from the center of and coaxially of the heating element toward the opposite ends respectively of the heating element, and electrically insulating material surrounding the helical conductor and insulating the same from the heating element.

6. In a temperature controlled electric soldering iron, an elongated metal tube, a soldering iron tip mounted on one end of the tube and electrically connected thereto, a hollow resistance heater element for the tip disposed in the tube and extending longitudinally thereof in radially spaced relation, a bi-element thermocouple in the tip, an electrical connector for the thermocouple extending longitudinally of and through the heating element including a helical wire conductor electrically connected to one of the elements of the thermocouple and being of the same material as the one element, the helical conductor being disposed substantially coaxially within the heating element in radially spaced relation and extending in opposite directions from the center of the heating element, and electrically insulating material embedding the helical conductor and electrically insulating the same from the heating element.

References Cited in the file of this patent

UNITED STATES PATENTS

| | | |
|---|---|---|
| 2,456,030 | Sohns | Dec. 14, 1948 |
| 2,735,923 | Juvinall et al. | Feb. 21, 1956 |
| 2,727,074 | Finch | May 22, 1956 |

UNITED STATES PATENT OFFICE
CERTIFICATE OF CORRECTION

Patent No. 2,897,335                                                     July 28, 1959

Thomas E. Finch

It is hereby certified that error appears in the printed specification of the above numbered patent requiring correction and that the said Letters Patent should read as corrected below.

Column 4, line 48, for "and the" read -- and through the --.

Signed and sealed this 23rd day of February 1960.

(SEAL)
Attest:

KARL H. AXLINE                                                  ROBERT C. WATSON
Attesting Officer                                             Commissioner of Patents